(12) United States Patent
Abramson et al.

(10) Patent No.: US 7,983,148 B1
(45) Date of Patent: Jul. 19, 2011

(54) DISASTER RECOVERY VIA ALTERNATIVE TERMINALS AND PARTITIONED NETWORKS

(75) Inventors: Sandra R. Abramson, Freehold, NJ (US); David L. Chavez, Thornton, CO (US); Stephen M. Milton, Freehold, NJ (US); Albert D. Pessot, Boulder, CO (US); Emil F. Stefanacci, Freehold, NJ (US)

(73) Assignee: Avaya Inc., Basking Ridge, NJ (US)

(*) Notice: Subject to any disclaimer, the term of this patent is extended or adjusted under 35 U.S.C. 154(b) by 1096 days.

(21) Appl. No.: 10/890,486

(22) Filed: Jul. 12, 2004

(51) Int. Cl.
*G06F 11/00* (2006.01)
*G01R 31/08* (2006.01)
*G08C 15/00* (2006.01)
*H04J 1/16* (2006.01)
*H04J 3/14* (2006.01)
*H04L 1/00* (2006.01)
*H04L 12/26* (2006.01)

(52) U.S. Cl. ........................................ 370/217; 370/237

(58) Field of Classification Search .......... 370/216–221, 370/225, 229–235, 237
See application file for complete search history.

(56) References Cited

U.S. PATENT DOCUMENTS

| | | | |
|---|---|---|---|
| 4,887,290 A * | 12/1989 | Dop et al. ........................ | 379/33 |
| 5,040,208 A | 8/1991 | Jolissaint | |
| 5,185,782 A | 2/1993 | Srinivasan | |
| 5,206,903 A | 4/1993 | Kohler et al. ................. | 379/309 |
| 5,247,571 A | 9/1993 | Kay et al. | |
| 5,339,356 A | 8/1994 | Ishii | |
| 5,404,395 A | 4/1995 | Bogart et al. ................. | 379/201 |
| 5,452,347 A | 9/1995 | Iglehart et al. | |
| 5,566,225 A | 10/1996 | Haas | |
| 5,566,236 A | 10/1996 | MeLampy et al. | |
| 5,570,343 A * | 10/1996 | Bishop et al. ................. | 370/216 |
| 5,664,007 A | 9/1997 | Samadi et al. | |
| 5,742,763 A | 4/1998 | Jones ......................... | 395/200.3 |
| 5,752,185 A | 5/1998 | Ahuja | |
| 5,802,510 A | 9/1998 | Jones ................................ | 707/2 |
| 5,819,084 A | 10/1998 | Shapiro et al. ................ | 395/610 |
| 5,826,039 A | 10/1998 | Jones ....................... | 395/200.36 |

(Continued)

FOREIGN PATENT DOCUMENTS

CA 2467482 A1 * 6/2003

(Continued)

OTHER PUBLICATIONS

U.S. Appl. No. 10/348,309, filed Jan. 20, 2003, Brunson et al.

(Continued)

*Primary Examiner* — Xavier Szewai Wong
(74) *Attorney, Agent, or Firm* — Sheridan Ross P.C.

(57) ABSTRACT

An enterprise network is provided that includes a plurality of internal terminals 108, 112 corresponding to a plurality of subscribers and a network reconfiguration agent 212 operable to (a) determine that at least one of a requested connection to a first terminal 112-1 associated with a subscriber and a connected communication with the first terminal 112-1 will have and/or has an undesirable grade of service and (b) in response thereto, perform at least one of the following operations: (i) direct the requested connection or connected communication to a second terminal 108, 140 associated with the subscriber; and (ii) change the communication path for the requested connection or connected communication from a first communication path comprising a first network 110 but not a second network 404 to a second communication path comprising the second network 404 but not the first network 110.

28 Claims, 5 Drawing Sheets

U.S. PATENT DOCUMENTS

| | | | |
|---|---|---|---|
| 5,828,747 A | 10/1998 | Fisher et al. | 379/309 |
| 5,864,874 A | 1/1999 | Shapiro | 707/201 |
| 5,905,793 A | 5/1999 | Flockhart et al. | 379/266 |
| 5,940,769 A * | 8/1999 | Nakajima et al. | 455/509 |
| 5,956,641 A * | 9/1999 | Bruckert et al. | 455/442 |
| 5,982,873 A | 11/1999 | Flockhart et al. | 379/266 |
| 5,995,606 A * | 11/1999 | Civanlar et al. | 379/207.13 |
| 5,995,830 A | 11/1999 | Amin et al. | |
| 6,031,896 A | 2/2000 | Gardell et al. | 379/88.17 |
| 6,032,040 A | 2/2000 | Choy et al. | |
| 6,038,296 A | 3/2000 | Brunson et al. | 379/100.11 |
| 6,038,302 A | 3/2000 | Burok et al. | |
| 6,088,441 A | 7/2000 | Flockhart et al. | 379/265 |
| 6,128,304 A | 10/2000 | Gardell et al. | 370/401 |
| 6,141,328 A | 10/2000 | Nabkel et al. | |
| 6,163,607 A | 12/2000 | Bogart et al. | 379/266 |
| 6,169,797 B1 | 1/2001 | Wildgrube et al. | |
| 6,173,053 B1 | 1/2001 | Bogart et al. | 379/266 |
| 6,185,603 B1 | 2/2001 | Henderson et al. | 709/206 |
| 6,192,122 B1 | 2/2001 | Flockhart et al. | 379/266 |
| 6,205,135 B1 * | 3/2001 | Chinni et al. | 370/356 |
| 6,275,713 B1 | 8/2001 | Toda | |
| 6,292,551 B1 | 9/2001 | Entman et al. | |
| 6,298,062 B1 | 10/2001 | Gardell et al. | 370/401 |
| 6,307,931 B1 | 10/2001 | Vaudreuil | 379/229 |
| 6,332,081 B1 | 12/2001 | Do | 455/461 |
| 6,360,222 B1 | 3/2002 | Quinn | 707/100 |
| 6,366,662 B1 * | 4/2002 | Giordano et al. | 379/221.01 |
| 6,411,682 B1 | 6/2002 | Fuller et al. | 379/67.1 |
| 6,445,918 B1 | 9/2002 | Hellander | |
| 6,516,061 B2 | 2/2003 | Horowitz et al. | |
| 6,535,600 B1 | 3/2003 | Fisher et al. | 379/265.12 |
| 6,556,668 B1 | 4/2003 | Achuthan et al. | |
| 6,561,805 B2 | 5/2003 | Kumar | 433/172 |
| 6,584,317 B2 | 6/2003 | Mukerjee et al. | |
| 6,603,965 B1 | 8/2003 | Dinkin | |
| 6,633,760 B1 | 10/2003 | Ham et al. | |
| 6,675,168 B2 | 1/2004 | Shapiro et al. | 707/100 |
| 6,700,967 B2 | 3/2004 | Kleinoder et al. | 379/201.1 |
| 6,704,304 B1 | 3/2004 | Gallagher et al. | 370/352 |
| 6,705,916 B2 | 3/2004 | Roberts et al. | |
| 6,738,462 B1 | 5/2004 | Brunson | 379/312 |
| 6,751,309 B2 | 6/2004 | Milton | |
| 6,768,718 B1 * | 7/2004 | Beshai et al. | 370/237 |
| 6,768,719 B1 * | 7/2004 | Couaillet | 370/242 |
| 6,775,542 B1 * | 8/2004 | Vilander et al. | 455/423 |
| 6,778,535 B1 * | 8/2004 | Ash et al. | 370/395.21 |
| 6,970,719 B1 * | 11/2005 | McConnell et al. | 455/554.1 |
| 6,993,360 B2 | 1/2006 | Plahte et al. | |
| 7,068,594 B1 * | 6/2006 | Tasker | 370/217 |
| 7,075,919 B1 * | 7/2006 | Wendt et al. | 370/352 |
| 7,130,620 B2 | 10/2006 | Forman et al. | |
| 7,152,179 B1 * | 12/2006 | Critchfield | 714/4 |
| 7,171,226 B2 | 1/2007 | Crocker et al. | |
| 7,274,667 B2 * | 9/2007 | McKinnon et al. | 370/234 |
| 7,352,852 B1 * | 4/2008 | Cocherl et al. | 379/114.02 |
| 7,508,754 B1 * | 3/2009 | Sankaranarayan et al. | 370/225 |
| 2001/0042126 A1 | 11/2001 | Wong et al. | 709/229 |
| 2002/0019829 A1 | 2/2002 | Shapiro | 707/201 |
| 2002/0021307 A1 | 2/2002 | Glenn et al. | 345/753 |
| 2002/0035594 A1 | 3/2002 | Dreke et al. | 709/203 |
| 2002/0035605 A1 | 3/2002 | McDowell et al. | 709/206 |
| 2002/0055775 A1 | 5/2002 | Petrovykh | 709/205 |
| 2002/0065894 A1 | 5/2002 | Dalal et al. | 709/206 |
| 2002/0076010 A1 | 6/2002 | Sahai | 379/88.19 |
| 2002/0083127 A1 | 6/2002 | Agrawal | 709/203 |
| 2002/0085701 A1 | 7/2002 | Parsons et al. | 379/211.01 |
| 2002/0086672 A1 | 7/2002 | McDowell et al. | 455/432 |
| 2002/0087630 A1 | 7/2002 | Wu | 709/203 |
| 2002/0090947 A1 | 7/2002 | Brooks et al. | |
| 2002/0097856 A1 | 7/2002 | Wullert, II | 379/201.01 |
| 2002/0101860 A1 * | 8/2002 | Thornton et al. | 370/352 |
| 2002/0114332 A1 * | 8/2002 | Apostolopoulos et al. | 370/392 |
| 2002/0116336 A1 | 8/2002 | Diacakis et al. | 705/51 |
| 2002/0116461 A1 | 8/2002 | Diacakis et al. | 709/204 |
| 2002/0120687 A1 | 8/2002 | Diacakis et al. | 709/204 |
| 2002/0120760 A1 * | 8/2002 | Kimchi et al. | 709/230 |
| 2002/0141400 A1 * | 10/2002 | DeMartino | 370/386 |
| 2003/0014491 A1 | 1/2003 | Horvitz et al. | 709/206 |
| 2003/0016810 A1 | 1/2003 | Milton | 379/242 |
| 2003/0016811 A1 | 1/2003 | Milton | 379/245 |
| 2003/0028621 A1 | 2/2003 | Furlong et al. | 709/219 |
| 2003/0061346 A1 * | 3/2003 | Pekary et al. | 709/224 |
| 2003/0073440 A1 | 4/2003 | Mukherjee et al. | 455/435 |
| 2003/0154293 A1 | 8/2003 | Zmolek | 709/206 |
| 2003/0200499 A1 * | 10/2003 | Khayrallah | 714/776 |
| 2004/0008710 A1 * | 1/2004 | Parra-Moyano et al. | 370/422 |
| 2004/0141484 A1 * | 7/2004 | Rogalski et al. | 370/338 |
| 2005/0048981 A1 | 3/2005 | Anupam et al. | |
| 2005/0070286 A1 | 3/2005 | Awasthi et al. | |
| 2005/0163093 A1 * | 7/2005 | Garg et al. | 370/342 |
| 2005/0271011 A1 * | 12/2005 | Alemany et al. | 370/331 |
| 2008/0002689 A1 * | 1/2008 | Vera | 370/389 |

FOREIGN PATENT DOCUMENTS

| | | |
|---|---|---|
| EP | 0416803 | 3/1991 |
| WO | WO 98/35482 | 8/1998 |

OTHER PUBLICATIONS

U.S. Appl. No. 10/387,112, filed Mar. 11, 2003, Milton.

U.S. Appl. No. 10/370,845, filed Feb. 21, 2003, Boyle et al.

U.S. Appl. No. 10/442,617, filed May 21, 2003, Abramson et al.

Greg Shah, "OS/2 Networking Made Easy," Golden Code Development Corp. (1998), available at http:/www.goldencode.com/atlos2/tips/1998_01/0198tips.html, 12 pages.

Avaya, "Configuring the Avaya™ SG203 Security Gateway to Support H.323 IP Trunking over Port Network Address Translation (PNAT)—Issue 1.0," Solution & Interoperability Test Lab Application Notes (Oct. 28, 2003), 22 pages.

Avaya White Paper, "Avaya IP Voice Quality Network Requirements," Issue 2.0 (Aug. 2002), pp. 1-28.

Richard Grigonis, *Computer Telephony Encyclopedia* (2000) pp. 367-375.

Richard Grigonis, *Computer Telephony Encyclopedia* (2000) pp. 413-430.

Richard Shockey, "ENUM: Phone Numbers Meet the Net" www.cConvergence.com (Jul. 2001) pp. 21-30.

Bill Michael, "The Politics of Naming" www.cConvergence.com (Jul. 2001) pp. 31-35.

The MIT Oxygen Project, Cambridge, MA, Apr. 25-26, 2000.

MIT Project Oxygen, "Oxygen: Pervasive, Human-Centered Computing" MIT Laboratory for Computer Science, MIT Artificial Intelligence Laboratory (May 2002).

Sugano et al.;"Common Presence and Instant Messaging (CPIM) Presence Information Data Format," Network Working Group (Dec. 2002), available at http://www.ietf.org/internet-drafts/draft-ietf-impp-cpim-pidf-07.txt, 26 pages.

Crocker et al.; "Common Presence and Instant Messaging (CPIM)," Network Working Group (Aug. 14, 2002), available at http://www.ietf.org/internet-drafts/draft-ietf-impp-cpim-03.txt, 33 pages.

Atkins et a.l; "Common Presence and Instant Messaging: Message Format," Network Working Group (Jan. 9, 2003), available at http://www.ietf.org/internet-drafts/draft-ietf-impp-cpim-msgfmt-08.txt, 31 pages.

Rose et al..; "The APEX Presence Service," Network Working Group (Jan. 14, 2002), available at http://www.ietf.org/internet-drafts/draft-ietf-apex-presence-06.txt, 31 pages.

Day et al.; "A Model for Presence and Instant Messaging," Network Working Group (Feb. 2000), available at http://www.ietf.org/rfc/rfc2778.txt?number=2778, 16 pages.

Day et al.; "Instant Messaging/Presence Protocol Requirements," Network Working Group (Feb. 2000), available at http://www.ietf.org/rfc/rfc2779.txt?number=2779, 25 pages.

Gulbrandsen et al.; "A DNS RR for Specifying the Location of Services (DNS SRV)," Network Working Group (Feb. 2000), available at http://ietf.org/rfc/rfc2782.txt?number=2782, 12 pages.

Fielding et al.; "Hypertext Transfer Protocol—HTTP/1.1," Network Working Group, Request for Comments 2068 (Jan. 1997), 152 pages.

Berners-Lee et al.; "Uniform Resource Identifiers (URI); Generic Syntax," Network Working Group, Request for Comments 2396 (Aug. 1998), 38 pages.

G. Klyne; "A Syntax for Describing Media Feature Sets," Network Working Group (Mar. 1999), available at http://www.ietf.org/rfc/rfc2533.txt?number=2533, 35 pages.

G. Klyne; "Protocol-independent Content Negotiation Framework," Network Working Group (Sep. 1999), available at http://www.ietf.org/rfc/rfc2703.txt?number=2703, 19 pages.

Holtman et al.; "Transparent Content Negotiation in HTTP," Network Working Group (Mar. 1998), available at http://www.ietf.orq/rfc/rfc2295.txt?number=2295, 55 pages.

Holtman et al.; "HTTP Remote Variant Selection Algorithm—RVSA/1.0," Network Working Group (Mar. 1998), available at http://www.ietf.orq/rfc/rfc2296.txt?number=2296, 13 pages.

Dawson et al.; "Vcard MIME Directory Profile," Network Working Group (Sep. 1998), available at http://www.ietf.org/rfc/rfc2426.txt?number=2426, 40 pages.

Andy Zmolek; "Simple and Presence: Enterprise Value Propositions," Avaya presentation, 16 pages, presented Jan. 24, 2002.

Avaya Inc.'s "Multivantage™ Software: Product Summary" at http://www.avaya.com/ac/common/index.jhtml?location=M1H1005G1002F2013P3042N4292 (printed Nov. 20, 2002).

Avaya Inc.'s "EC500 Key Features" at http://www.avaya.com/ac/common/index.jhtml?location=M1H1005G1015F2062P3142N4988 (printed Nov. 20, 2002).

Avaya Inc.'s "EC500: Product Summary" at http://www.avaya.com/ac/common/index.jhtml?location=M1H1005G1015F2062P3142N4986 (printed Nov. 20, 2002).

"IP LAN Telephony: the Technology Migration Imperative" Avaya Executive Briefing Paper (Feb. 2002), pp. 1-21.

"Avaya Announces New Enterprise Class IP Solutions (ECLIPS)" *Communication without Boundaries* (2002).

David Chavez et al., "Avaya MultiVantage™ Software: Adapting Proven Call Processing for the Transition to Converged IP Networks," *Communication without Boundaries* (Aug. 2002).

"SIP (Session Initiation Protocol) in Enterprise-Class IP Telephony Networks," *Communication without Boundaries* (2002).

Avaya Communications, "EC500 Extension to Cellular, Release 2, User's Guide," Issue 1 (Jul. 2001).

Avaya, "EC500 Extension to Cellular, Release 3, User's Guide," Issue 2 (Jan. 2002).

Avaya. "EC500 Extension to Cellular, Release 3 and Release 4, User's Guide," Issue 3 (Aug. 2002).

Avaya, "EC500 Extension to Cellular, Release 4, User's Guide,"Issue 4 (Aug. 2002).

Digital HotDesk User Referendce Guide, p. 44 (and cover pages), Avaya Inc., 2000.

Product Data Sheet—Covigo Workflow Server, Covigo, Inc., 2001, 2 pages.

* cited by examiner

DISASTER RECOVERY VIA ALTERNATIVE TERMINALS AND PARTITIONED NETWORKS

CROSS REFERENCE TO RELATED APPLICATIONS

The present application contains subject matter related to U.S. patent application Ser. Nos. 10/442,617, filed May 21, 2003, to Abramson et al. entitled "DROPPED CALL CONTINUATION"; 10/387,112, filed Mar. 11, 2003, to Milton entitled "SWITCH BUTTONS ACTIVATED FROM AN EXTERNAL NETWORK"; 10/370,845, filed Feb. 21, 2003, to Boyle et al. entitled "SUBSCRIBER MOBILITY IN TELEPHONY SYSTEMS"; 09/908,155, filed Jul. 18, 2001, to Milton, entitled "METHOD AND APPARATUS FOR TREATING EXTERNALLY-ORIGINATED CALLS AS COMING FROM INTERNAL SWITCH EXTENSIONS"; and 09/908,156, filed Jul. 18, 2001, Milton, entitled "METHOD AND APPARATUS FOR EXTENDING CALLS TO INTERNAL SWITCH EXTENSIONS OUT TO EXTERNAL NETWORK ENDPOINTS", each of which is incorporated herein by reference.

FIELD OF THE INVENTION

The invention relates generally to telecommunication networks and particularly to enterprise telecommunication networks.

BACKGROUND OF THE INVENTION

In recent years, there is a dramatic trend in telecommunications to use packet-switched networks over circuit-switched networks for voice communications. Packet-switched networks offer more versatility, flexibility, and media capabilities than circuit-switched networks and at a lower cost. Although the quality of voice communications is generally not as high as circuit-switched networks, dramatic gains have been made in the Quality of Service or QoS of packet-switched voice communications.

Compared to circuit-switched networks, many IP-PBX systems, however, continue to suffer from reliability issues. Many Internet Protocol-Private Branch Exchange or IP-PBX systems are susceptible to serious/severe outage when the IP network is disrupted. Disruptions can occur, for example, due not only to contact with a prolific virus or worm but also the activities of hackers. When a disruption occurs, the engineering complexities of the platforms supporting the Local Area Network IP telephony can cause extreme difficulties in identifying the source of the disruption and lengthen the period of the disruption relative to circuit-switched networks. Moreover since servers for Voice over IP or VoIP calls answer incoming calls automatically, incoming calls to a terminal experiencing a disruption are typically lost, which can cause caller frustration.

Because the system is IP-centric, fallback mechanisms are often limited and often undesirable. While technology is available to re-route packet-switched or circuit-switched calls over different facilities when primary facilities are unavailable, many customers do not want a backup analog or DCP station sitting on their desk as a backup in the event of IP phone failure. Technology is also available, such Avaya Inc.'s EC500™ product, to bridge an incoming call to a desk phone to a cellular phone. This alternative has the drawback of having two phones ringing in the user's office at the same time even though no problem with the IP telephony is encountered the vast majority of the time. Finally, some enterprise networks have used a parallel network strictly for voice communications. While a parallel network can provide the necessary protection from the problems with general data traffic, it is an expensive solution.

SUMMARY OF THE INVENTION

These and other needs are addressed by the various embodiments and configurations of the present invention. The invention generally changes to a second communication path when the grade of service of a first communication path is not acceptable. This is particularly useful for terminating calls to an internal endpoint of an enterprise network. As used herein, the "grade of service" refers to a quality or grade of a communication session between two endpoints. Grade of service can be expressed in differing ways, such as Quality of Service or QoS, whether connectivity can be established, and the like.

In one embodiment of the present invention, a method for processing a communication in an enterprise network is provided. The method includes the steps:

(a) determining that a requested connection (e.g., a call set-up request) to a first terminal associated with a subscriber or a connected communication (e.g., a voice call) with the first terminal will have or has an undesirable grade of service;

(b) in response thereto, performing one or more of the following steps:

(i) directing the requested connection and/or connected communication to a second terminal associated with the subscriber; and (ii) changing the communication path for the requested connection and/or connected communication from a first communication path including a first network but not a second network to a second communication path including the second network but not the first network. Each of the first and second communication paths are connected to the same set of endpoints that includes the first terminal.

An example of step (i) is to configure the communications system so that cell phone numbers are provisioned on a per-subscriber basis. The cell phone associated with a subscriber would not be signaled by the system until such time as the grade of service of communications with the subscribers internal terminal becomes undesirable or unacceptable. In that event, the system routes incoming communications to the subscriber to the administered cell phone number, commonly until such time as the grade of service for the subscriber's internal terminal improves to an acceptable level.

An example of step (ii) is to configure the system so that traffic can be preferred on one data network over another. In other words, the system is configured so that a private data network handles some types of communications and other types of communications occur between the same entities on an open network. This is typically accomplished using a series of preference algorithms in building media connections between IP entities.

The present invention can provide benefits over the prior art. For example, when compared to existing systems the use of pre-provisioned endpoints and partitioned networks can provide substantial increases in IP network reliability without significantly increasing the capital and operating costs of the network. Because current IP telecommunications networks are often hybrid architectures, or a mixture of Time Division Multiplexed (TDM) (or circuit-switched) and IP (or packet-switched) devices, and already partitioned and because the use of cell phones is widespread, the invention may be implemented without retrofitting existing networks. The use of a preferential network hierarchy can provide for a far more resilient IP connection network topology for telecommunications than is currently available in the art. When a local area network has a catastrophic failure, other back-end telecommunication networks (such as used for signaling between a media server and port networks), that are not affected by the failure, are capable of establishing communications with the internal terminals.

These and other advantages will be apparent from the disclosure of the invention(s) contained herein.

The above-described embodiments and configurations are neither complete nor exhaustive. As will be appreciated, other embodiments of the invention are possible utilizing, alone or in combination, one or more of the features set forth above or described in detail below.

DETAILED DESCRIPTION

The Communication System of the First Embodiment

The invention will be illustrated below in conjunction with an exemplary communication system. Although well suited for use with, e.g., a system having a private branch exchange (PBX) or other similar contact processing switch or server, the invention is not limited to use with any particular type of communication system switch or server or configuration of system elements. Those skilled in the art will recognize that the disclosed techniques may be used in any communication application in which it is desirable to provide improved contact processing directed from an external network into a PBX or other communication system switch or server. The term "contact" or "call" as used herein is intended to include not only telephone calls but also non-telephonic communications, such as data transmissions such as electronic mail, voice-over-IP, facsimile, etc., whether circuit switched or packet switched.

Figure 1:
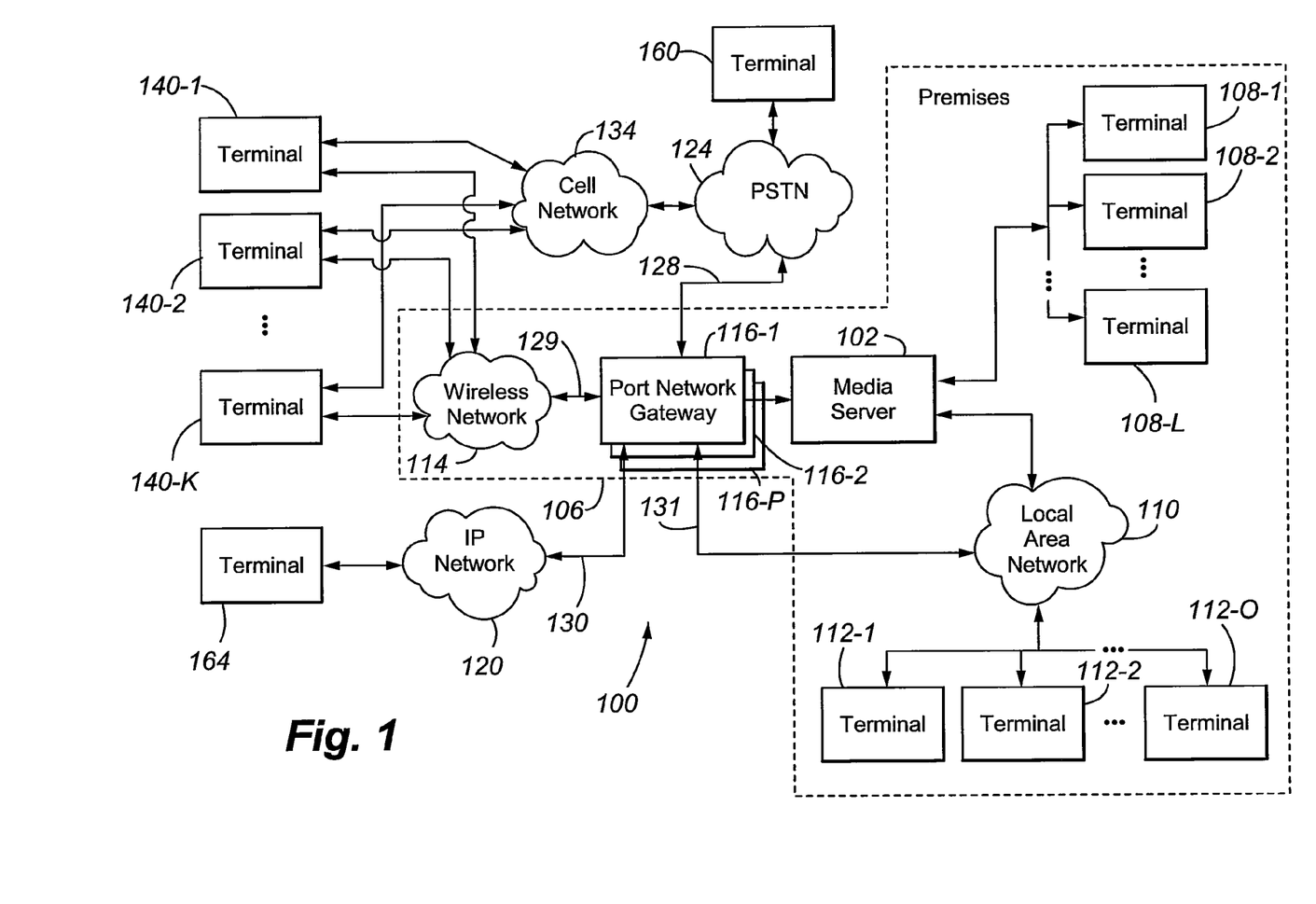
FIG. 1 shows an exemplary communication system according to an embodiment of the present invention.

FIG. 1 shows an exemplary communication system 100 in which the invention is implemented. The system 100 includes a media server 102 that serves a premises 106, including circuit-switched terminals 108-1, 108-2, . . . 108-L that are subscribers to the server 102, a Local Area Network 110 that serves a number of terminals 112-1. 112-2, . . . 112-0 that are also subscribers to the server 102, a Wireless Local Area Network or WLAN 114, and a plurality of port networks/gateways 116-1, 116-2, 116-P providing connectivity and interoperability between the premise 106 and the IP network 120 and Public Switched Telephone Network or PSTN 124. Each of the terminals 108-1, 108-2, . . . 108N and 112-1, 112-2, . . . 112-O has a corresponding internal extension. These extensions are referred to herein as "internal" in that they are extensions within the premises 106 that are directly serviced by the server. More particularly, these extensions correspond to conventional terminal endpoints serviced by the server, and the server can direct incoming calls to and receive outgoing calls from these extensions in a conventional manner.

The term "server" as used herein should be understood to include a PBX, an enterprise switch, an enterprise server, or other type of telecommunications system switch or server, as well as other types of processor-based communication control devices such as computers, adjuncts, etc. By way of example, the server in the exemplary embodiment are implemented as an otherwise conventional S8700™, S8300™, or IP600™ running Avaya Inc. Communication Manager™ or MultiVantage™ software. Other types of known servers are well known in the art and therefore not described in detail herein. The terminals 108 and 112 may be wired desktop telephone terminals or any other type of terminals capable of communicating with the server. The word "terminal" as used herein should therefore be understood to include not only wired or wireless packet-switched and circuit-switched desktop telephone terminals, such as a Plain Old Telephone or POTS, a DCP phone, an IP hardphone, and an IP softphone, but also other types of processor-based communication devices, including without limitation mobile telephones, personal computers, personal digital assistants (PDAs), etc.

The port network/gateway 116 can be any device(s). As used herein, a "gateway" to a functional unit that interconnects two computer networks with differing network architectures, such as an IP network and a circuit-switched network. In a preferred configuration, the port network/gateway is a conventional Avaya Inc. G700, G600™, or MCC/SCC™ gateway.

The LAN 110 is a conventional local area network that uses wires and/or optical fiber as a common carrier medium. It may employ any suitable protocol, with the Ethernet Protocol being preferred. The LAN 110 is in communication with the port network/gateway 116 via communication line 131.

The WLAN 114 is a conventional local area network that uses wireless radiation, such as low microwave frequencies, millimetric waves, and/or infra-red beams as a communications medium. It can use any suitable wireless protocol, such as 802.11 g. Channeling is normally provided by using spread spectrum methods and code division multiple access. The WLAN is in communication with the port network/gateway 116 by means of communication line 129

The premise 106 is coupled via one or more communication lines 128 to the PSTN 124, which in turn is coupled to a terminal 160, and one or more communication lines 130 to the IP network 120, which in turn is coupled to terminal 164. In one configuration, the communication lines 124 are trunk lines. The various communication lines carry incoming contacts from the external networks 120 and 124 to the premise 106 for processing and carry outgoing contacts from the terminals to the network.

The PSTN 124 is coupled via one or more cell networks 134, which have associated therewith terminals 140-1, 140-2, . . . 140-K. Preferably to permit effective mapping by the server, the wireless networks or other transit networks between the user's external terminal and corresponding internal terminal are configured such that the server receives not only the intended destination address but also the source address or identity of the external device initiating the contact.

It should be noted that the invention does not require any particular type of information transport medium between the premise and terminals 140, i.e., the invention may be implemented with any desired type of transport medium as well as combinations of different types of transport media. The one or more cell networks may be wireless cellular systems of a type well known in the art.

Each of the terminals 140-1, 140-2, ... 140-K, 160, and 164 represents an external terminal not corresponding to any internal extension of the premise 106. These terminals are referred to as "external" in that they are not directly supported as terminal endpoints by the premise 106. Like the terminals 108 and 112, the terminals 140, 160, and 164 may be wired or wireless desk sets, mobile telephones, personal computers, PDAs, etc. The terminals 140, 160, and 164 are an example of devices more generally referred to herein as "external endpoints."

Although shown as being connected to the cell network(s) 134 in FIG. 1, one or more of the external terminals 140 could instead be connected directly to the premise 106. For example, the WLAN 114 can be in wireless communication with one or more of the terminals 140-1, 140-2, ... 140-K. More generally, the present invention can be implemented using any desired type of external endpoint and network connection.

As will be described in greater detail below, the present invention in accordance with an embodiment of the present invention configures the server such that one or more of the external terminals 140 are treated substantially as internal server extensions. Advantageously, this allows a given external terminal to access at least a subset of the desirable contact processing features provided by the server as described in copending U.S. patent application Ser. Nos. 10/387,112, filed Mar. 11, 2003, to Milton entitled "SWITCH BUTTONS ACTIVATED FROM AN EXTERNAL NETWORK"; 09/908,155, filed Jul. 18, 2001, to Milton, entitled "METHOD AND APPARATUS FOR TREATING EXTERNALLY-ORIGINATED CALLS AS COMING FROM INTERNAL SWITCH EXTENSIONS"; and 09/908,156, filed Jul. 18, 2001, Milton, entitled "METHOD AND APPARATUS FOR EXTENDING CALLS TO INTERNAL SWITCH EXTENSIONS OUT TO EXTERNAL NETWORK ENDPOINTS".

It should be emphasized that the configuration of the server, user terminals, and other elements as shown in FIG. 1 is for purposes of illustration only and should not be construed as limiting the invention to any particular arrangement of elements.

Figure 2:
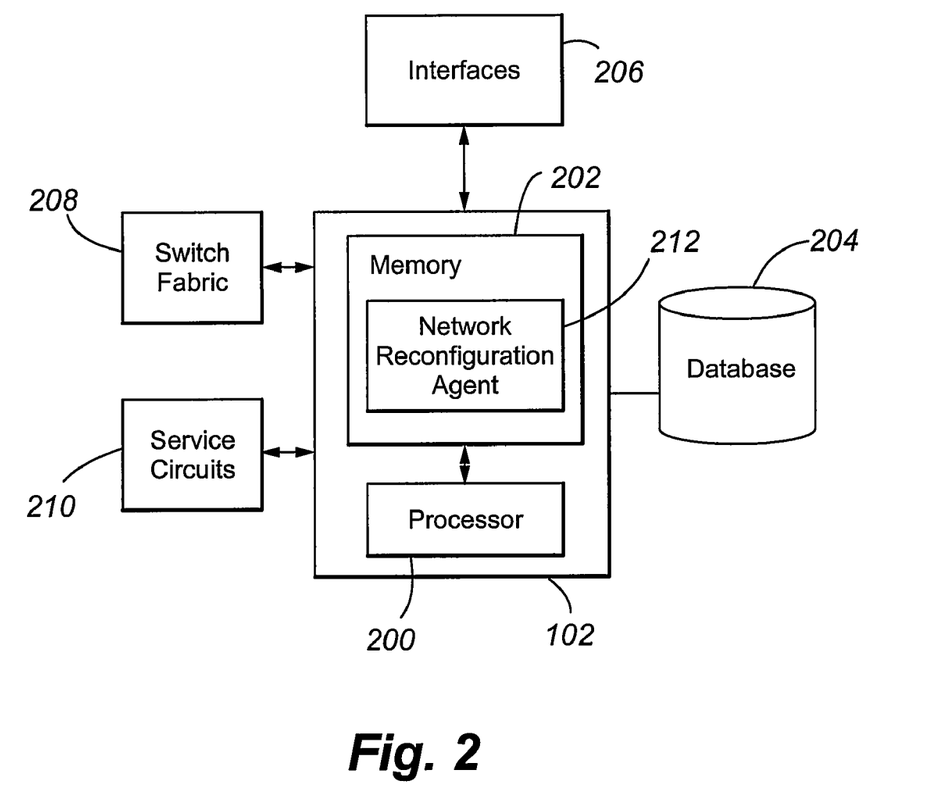
FIG. 2 is a block diagram showing a server configuration according to an embodiment of the present invention.

FIG. 2 shows a more detailed view of one possible implementation of the server 102 in the system of FIG. 1. The server 102 in this implementation includes a processor 200, a memory 202, a database 204, one or more interfaces 206, a switch fabric 208, and a set of service circuits 210. The processor 200 may be implemented as a central processing unit (CPU), microprocessor, application-specific integrated circuit (ASIC) or other type of digital data processor as well as various portions or combinations of such elements. The memory may be a random access memory (RAM), a read-only memory (ROM), or combinations of these and other types of electronic memory devices.

The processor 200 operating in conjunction with the memory 202 executes one or more software programs depicted in FIG. 2 as the network reconfiguration agent 212. The agent 212 determines whether or not the grade of service for one of the premise terminals 108 and 112 is acceptable and, if not, effects contacting a pre-provisioned alternate endpoint, such as one or more of external terminals 140, 160, and 164 or another internal terminal served by a different, physically diverse network, such as a terminal 108 or, in certain configurations, an internal terminal serviced by the wireless LAN 114. The determination may be made when a communication is initiated and/or during an already connected communication between two endpoints. It may be made for incoming or inbound and/or outgoing or outbound communications. The grade of service can be unacceptable for many reasons. For example, it may be unacceptable because the connectivity to an internal station cannot be confirmed by the media server or, even though connectivity may be established, there is insufficient bandwidth for the communication. The connectivity may be unconfirmed for many reasons, including the disruption of a premise transit network (such as in the WLAN 114 or LAN 110), the malfunction of a node in a transit network, and the malfunction or unavailability of the internal station itself. Bandwidth may be deemed to be insufficient when a metric (e.g., latency, packet loss, and jitter) involved with the communication itself or the communication lines between the internal station and an external endpoint exceed specified, QoS thresholds.

The database 204 may be, e.g., an optical or magnetic disk-based storage device, or other conventional storage device associated with or otherwise accessible to the server 102. The database 204 may be used to store, e.g., feature assignments to particular feature activators or codes, directory number assignments to corresponding call appearances or direct facility termination keys, access restrictions, and other known administrative information regarding the configuration of the system 100, as well as other types of information.

The service circuits 210 may include tone generators, announcement circuits, etc. These circuits and the interfaces 206 are controlled by processor 200 in implementing call processing functions in the server 102.

The server 102 may include additional elements that are omitted from FIG. 2 for simplicity and clarity of illustration. For example, the server may include a port card for each type of user terminal associated therewith. In addition, it will be appreciated by those skilled in the art that the server 102 may be configured to support multiple user terminals of different types, e.g., wired desk set terminals, wireless desk set terminals, personal computers, video telephones or other advanced terminals, etc.

Also associated with the server 102 may be an administrator terminal (now shown) which is used to program the operation of the server 102 during a system administration, e.g., an initial set-up and configuration of the system of a subsequent system-level or user-level configuration.

Other devices not shown in the figures may be associated with the server 102, such as an adjunct feature server. Such an adjunct may be physically incorporated within the server and may be partially or completely implemented using other server elements such as processor 200 and memory 202.

Figure 3:
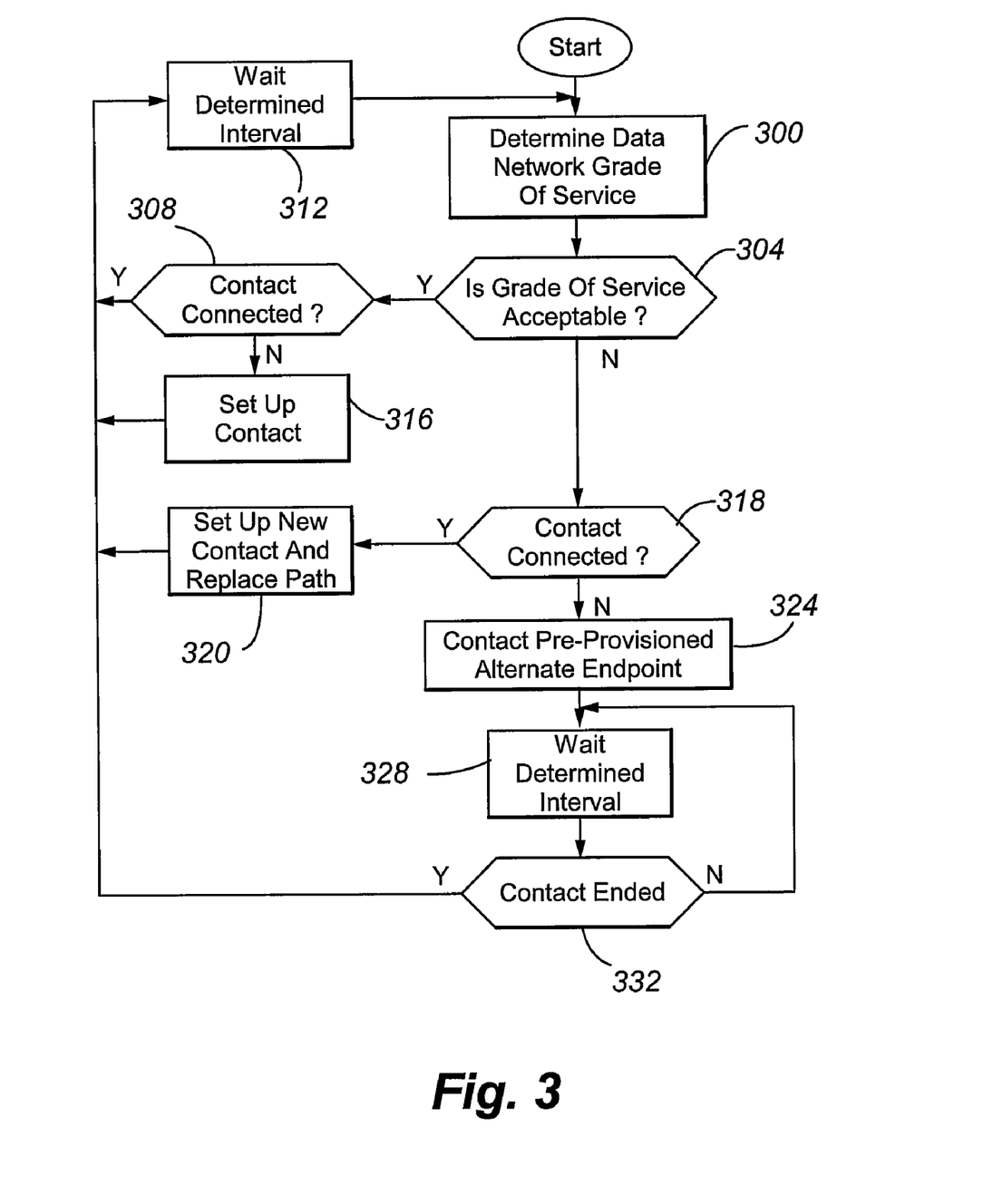
FIG. 3 is a flow diagram showing the operation of the network reconfiguration agent according to an embodiment of the present invention.

The Operation of the Network Reconfiguration Agent in the First Embodiment The operation of the network reconfiguration agent will now be described with reference to FIGS. 1-3.

In step 300, the agent 212 determines the data network's grade of service. This step may be performed only when a communication is initiated and/or on a continual basis. This step can be performed by numerous techniques. For example, the internal station can be polled (with the failure of the terminal to respond to the polling message deemed to be a lack of connectivity) and/or an interrupt can be generated by the system 100 when the system 100 detects that the socket that was opened for the communication has closed (such as would be the case for a catastrophic network failure). Alternatively, the grade of service can be determined by known techniques, such as periodically transmitting one or more packets to a selected internal station and measuring performance metrics, obtaining performance metrics, such as specified in the RTCP protocol, from communications between other endpoints, or otherwise periodically making test connections and measuring the performance metrics.

In decision diamond 304, the agent 212 determines whether or not the grade of service is acceptable. This is typically effected by determining whether or not connectivity to the communication source or destination internal terminal. Alternatively or additionally, it may be effected by comparing the measured metrics against one or more thresholds for each of the corresponding metrics.

When the grade of service is acceptable, the agent 212, in decision diamond 308 determines whether or not the communication or contact is already connected or in progress. When the communication or contact is currently in progress, the agent 212 proceeds to step 312 and waits a predetermined time interval before repeating step 300. As noted, rather than waiting a predetermined time interval the performance of step 300 can be event-based such that a selected event or set of events causes the performance of step 300. An example of an event is the receipt of an incoming communication addressed to an internal terminal. When the communication or contact is not currently setup, the agent 212, in step 316, completes set up of the contact and proceeds to step 312.

When the grade of service is unacceptable, the agent 212, in decision diamond 318 determines whether or not the communication or contact is already connected or in progress. When the communication or contact is currently in progress, the agent 212 proceeds to step 320 and sets up a new contact with a pre-provisioned endpoint, whether internal or external, and replaces the current communication path to the internal terminal involved in the communication with a new communication path to the pre-provisioned endpoint. The subscriber of the internal terminal is notified, such as by a set of tones or voice message played over the terminal's speaker, a special alerting ring played by the endpoint, or text message displayed on the terminal's display, that the alternative new communication path is available and requires him to place the pre-provisioned endpoint in an off-hook state to establish the new communication path and place the internal station in an on-hook state to terminate the existing communication path. Alternatively, the server can force the pre-provisioned endpoint to auto-answer to establish the new path and terminate the current path without subscriber participation. Alternatively, the subscriber can be given the option of continuing the communication on the current channel notwithstanding the low grade of service. The agent 212 then proceeds to step 312. When the communication or contact is currently in progress, the agent 212 proceeds to step 324.

In step 324, the agent 212 sets a feature bit in the station record (in the database 204) for the internal terminal experiencing the unacceptable grade of service and contacts the pre-provisioned alternative endpoint. The feature bit notifies the server that the state of the terminal is out-of-service and that all communications to the corresponding internal terminal are to be forwarded to the alternative endpoint. In one configuration, the pre-provisioned endpoint is a terminal 140 and the communication is effected through the cell network 134.

The communication is directed to the terminal 140 associated with the subscriber, using a bridging methodology similar to that of the EC500™ product of Avaya, Inc. As noted, when grade of service is re-established, the feature bit is unset by the agent 212 and communications are thereafter sent to the addressed destination, or the internal terminal, and not alternatively or additionally to the terminal 140.

In step 328, the agent 212 waits a determined interval and, upon the passage of the determined interval, determines in decision diamond 332 whether or not the contact has ended. If so, the agent 212 proceeds to step 312. If not, the agent 212 repeats step 328.

The Communication System of the Second Embodiment

Figure 4:
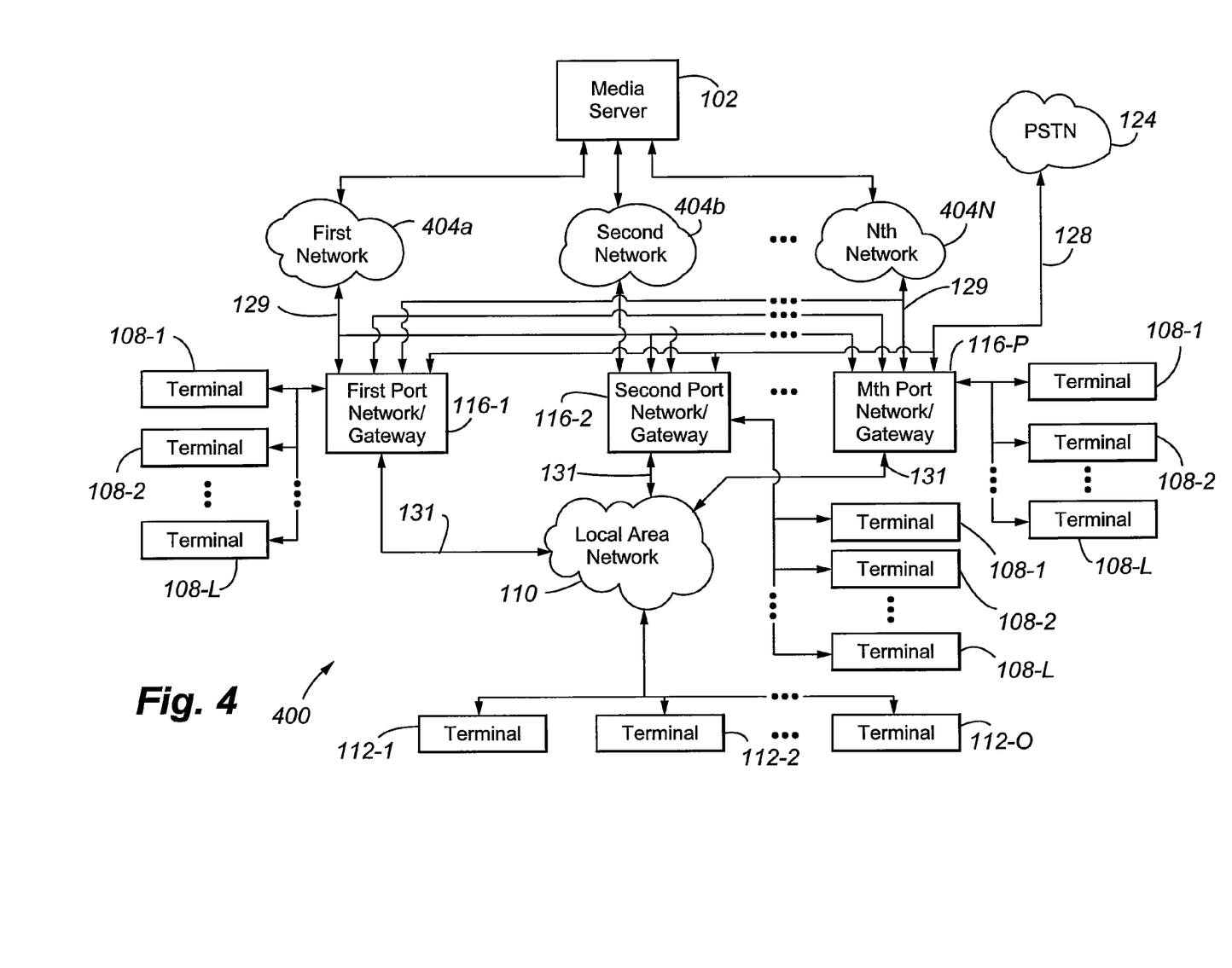
FIG. 4 shows an exemplary communication system according to another embodiment of the present invention.

FIG. 4 illustrates a communication system 400 according to a second embodiment of the present invention. The system 400 includes partitioned, physically diverse first, second, . . . Nth enterprise or private packet-switched networks 404a, b, and n, respectively. Each of the networks is connected by wired or wireless communication links to each of the plurality of port network/gateways 116. Although the networks are typically packet-switched, they can be circuit-switched. Typically, each of the networks is configured as a local area network, though one or more of the networks can be an open network depending on the configuration of the system 400.

A preference or priority is assigned by the agent 212 to each of the private networks and open networks. For example, an incoming communication is preferentially directed from one port network/gateway to another port network/gateway first over the first network 404a if the grade of service of the network is adequate; if the first network has too low of a grade of service, second over the second network 404b if the grade of service of the network is adequate; and so on until a network having an adequate grade of service is identified. An open network, such as the PSTN 124 and trunks 128, can be included in the network preferential hierarchy. To reduce network congestion and the likelihood of a catastrophic failure during a communication, the last network preference is typically the LAN 110 to which all of the packet-switched communication devices 112, Personal Computers, and other peripheral devices are connected. Of the private networks, the LAN 110 has the highest likelihood of providing an unacceptable grade of service.

By way of illustration, assume an incoming communications arrives by way of the PSTN 124 and a trunk 128 to port network/gateway 116-P. The communication designates a terminal 108 connected to the port network/gateway 116-1 as the destination. Normally, the communication is routed through the LAN 110 to the port network/gateway 116-1. When the LAN 110 experiences an unacceptable grade of service, such as due to a catastrophic failure, the communication can be routed through any of the first, second, . . . Nth networks to the first port network/gateway 116-1. As will be appreciated, if the grade of service becomes unacceptable during a communication, the communication can be moved from one path over a network of a higher preference to another path over a network of a lower preference but higher grade of service. The path migration can be seamless to the subscriber and contactor.

The Operation of the Network Reconfiguration Agent in the Second Embodiment

Figure 5:
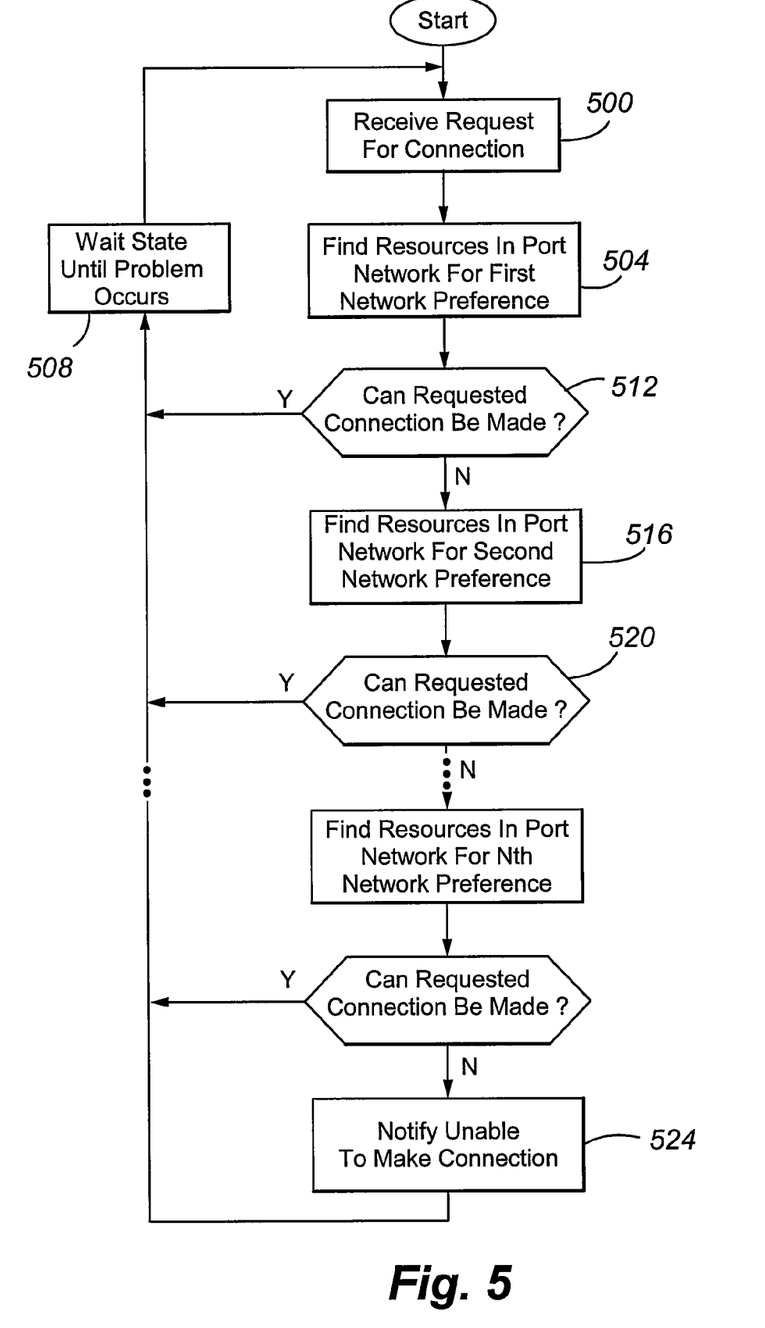
FIG. 5 is a flow diagram showing the operation of the network reconfiguration agent according to another embodiment of the present invention.

The operation of the agent 212 of the second embodiment will now be described with reference to FIGS. 4 and 5.

In step 500, the agent 212 receives a request for a connection. The request may result from an inbound communication or an outbound communication but typically results from an inbound communication.

In step 504, the agent 212 determines the destination terminal and the corresponding port network/gateway 116 serving the terminal and finds the resources in the port network for the first network preference. In this step, the resources can be the available bandwidth for the communication for at least a minimum desired grade of service for the communication. In this configuration, the performance metrics for the first network preference are measured and compared to the minimum desired metrics for the communication to determine if the resources are available. In another configuration, the resources are deemed to exist if a connection for the communication can be made via the first network preference regardless of the performance metrics for the first network preference. In decision diamond 512, the agent 212 determines whether or not the requested connection can be made to the corresponding port network/gateway using the first network preference. If so, the agent 212 proceeds to step 508 and enters a wait state until a network-related problem occurs or a request to initiate or terminate a communication is received. In one configuration, test connections are periodically attempted for each of the networks, and networks having an inadequate grade of service or otherwise not being connectable are removed from the list of network preferences. If not, the agent 212 proceeds to step 516.

In step 516, the agent 212 finds the resources in the port network/gateway 116 for a second network preference as set forth above in connection with step 504. In decision diamond 520, the agent 212 determines whether the requested connection can be made as set forth above in connection with decision diamond 508.

These steps are repeated until either a network preference is identified that can make the connection or the network preferences are exhausted. If the list of network preferences is exhausted, the agent 212, in step 524, notifies the contactor and/or contactee that the system 400 is currently unable to make the requested connection.

A number of variations and modifications of the invention can be used. It would be possible to provide for some features of the invention without providing others.

For example in one alternative embodiment, the communication is redirected back to the internal terminal when the grade of service reaches an acceptable level. The procedure for changing communication paths is described above with reference to step 320. The change back to the original communication path is desirable, for example, to avoid additional cell phone charges.

In another alternative embodiment, the network preferences vary by the class of service of the subscriber involved in the communication. For example, the first network preference for an executive of a company is different than the first network preference for a non-executive.

In yet another embodiment, the agent 212 is implemented by a logic circuit, such as an ASIC, or by a combination of software and a logic circuit.

The present invention, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g. for improving performance, achieving ease and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

Moreover though the description of the invention has included description of one or more embodiments and certain variations and modifications, other variations and modifications are within the scope of the invention, e.g. as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method for processing a communication in an enterprise network, comprising:
   (a) determining, by a processor, that at least one of a requested connection to a first terminal associated with a subscriber and a connected communication with the first terminal will have upon set up and/or currently has an unacceptable grade of service, respectively;
   (b) in response thereto, a processor capable of performing both of the following:
   (i) directing, by the processor, the at least one of a requested connection and a connected communication to a second terminal associated with the subscriber, the first and second terminals being different from one another and the first terminal being a wired terminal other than a cellular phone and second terminal being a cellular phone; and
   (ii) changing, by the processor, the communication path for the at least one of a requested connection and a connected communication from a first communication path comprising a first private network but not a second private network to a second communication path comprising the second private network but not the first private network, wherein, in (ii), each of the first and second communication paths are connected to the same set of endpoints that includes the first terminal and the first and second communication paths use a common public network, wherein, in (ii), each of the first and second private networks has a corresponding preference for carrying communications, and wherein the first and second private networks are part of a common enterprise network; wherein the at least one of a requested connection and a connected communication is a requested connection, wherein the requested connection is received by a first port network and/or gateway, wherein the first terminal is connected to a second port network and/or gateway, wherein the first and second port networks and/or gateways are part of the common enterprise network, wherein each of the first and second private networks connect the first and second port networks and/or gateways, and wherein the changing step comprises:
determining the highest preference private network capable of providing the desired grade of service for the at least one of a requested connection and a connected communication.

2. The method of claim 1, wherein the at least one of a requested connection and a connected communication is a requested connection, wherein the requested connection will have an unacceptable grade of service if completed and wherein the unacceptable grade of service results from a catastrophic failure of a network to which the first terminal is connected.

3. The method of claim 1, wherein the at least one of a requested connection and a connected communication is a connected communication, wherein the communication has an unacceptable grade of service, and wherein the unacceptable grade of service results from congestion of a network to which the first terminal is connected.

4. The method of claim 1, wherein (i) is performed and wherein a database accessible by a server has, for each of a plurality of subscribers, a corresponding internal first telephone address for a wired terminal supported by the server and a corresponding external second address for a cellular phone not supported by the media server.

5. The method of claim 4, wherein the at least one of a requested connection and a connected communication is a communication connected on a first connection and wherein the communication has an unacceptable grade of service and wherein the directing step comprises:
establishing a second connection between the terminal of a contactee in the communication with the second terminal;
notifying the subscriber of the second connection; and
when the subscriber accepts the second connection, disconnecting the first connection.

6. The method of claim 4, wherein the at least one of a requested connection and a connected communication is a requested connection and wherein the requested connection will have an unacceptable grade of service if completed and the directing step comprises:
setting up the requested communication with the second terminal.

7. The method of claim 4, wherein after (i) the grade of service for the requested connection increases to an acceptable level and further comprising: redirecting the requested communication to the first terminal.

8. The method of claim 1, wherein (ii) is performed, wherein the preference changes dynamically in response to changes in the grade of service for each of the first and second private networks and wherein the first private network has a higher preference for the at least one of a requested connection and a connected communication than the second private network.

9. The method of claim 1, wherein (ii) is performed and wherein the first private network is a data network carrying bearer traffic and the second private network carries control signaling between a media server and port networks.

10. The method of claim 4, wherein the at least one of a requested connection and connected communication is redirected to the first terminal when a grade of service over the first communication path becomes acceptable.

11. The method of claim 5, wherein the subscriber is notified of the second connection by at least one of a set of tones played over the first terminal, a voice message played over the first terminal, a special alerting ring played by the first terminal, and a text message displayed on the first terminal's display and wherein the subscriber accepts the second connection by at least one of placing second terminal in an off-hook state and placing the first terminal in an on-hook state.

12. The method of claim 5, wherein the server forces the second terminal to auto-answer the second connection and the first terminal to terminate the connected communication.

13. The method of claim 5, wherein a feature bit is set in a station record for the first terminal, the feature bit notifying the server that the state of the terminal is out-of-service and that all communications to the first terminal are to be forwarded to the second terminal.

14. The method of claim 8, wherein the at least one of a requested connection and a connected communication is a connected communication and further comprising:
determining a set of performance metrics for the first communication path;
comparing the set of performance metrics against a selected set of performance metrics to determine whether a grade of service is acceptable; and
when the grade of service using the first communication path is not acceptable, performing step (ii).

15. The method of claim 8, wherein the at least one of a requested connection and a connected communication is a requested connection over the first communication path to the first terminal, wherein the first communication path has a higher preference than the second communication path, and further comprising:
identifying at least one of a port network and gateway in the first communication path to the first terminal;
determining a first set of performance metrics for the first communication path;
comparing the first set of performance metrics against a selected set of performance metrics to determine whether a grade of service is acceptable for the first communication path;
when the grade of service is acceptable, completing the requested connection using the first communication path;
when the grade of service is not acceptable, identifying at least one of a port network and gateway in the second communication path to the first terminal;
determining a second set of performance metrics for the second communication path;
comparing the second set of performance metrics against a selected set of performance metrics to determine whether a grade of service is acceptable for the second communication path;
when the grade of service is acceptable, completing the requested connection using the second communication path; and
when the grade of service is not acceptable, repeating the identifying, determining, and comparing steps with respect to a third communication path to the first terminal.

16. The method of claim 8, wherein the preference of each of the first and second networks changes by a class of service of a subscriber involved in the at least one of a requested connection and connected communication the class of service being a function of the identity of the subscriber, such that at a selected time, for a first subscriber corresponding to a first class of service, a first private network has a first preference and a second private network a second preference and, for a second subscriber corresponding to a second class of service, the first private network has a second preference and the second private network a first preference.

17. The method of claim 8, wherein the at least one of a requested connection and connected communication is redirected to the first communication path when a grade of service over the first communication path becomes acceptable.

18. The method of claim 8, wherein the first private network is of a first type, wherein the second private network is of a second type, wherein the first and second private networks are packet-switched, wherein the first and second types are different from one another, and wherein the network type is determined by a communication protocol employed by the respective network.

19. A non-transitory computer readable information storage medium comprising processor executable instructions operable, when executed, to perform the steps of claim 1.

20. An enterprise network, comprising: a plurality of internal terminals corresponding to a plurality of subscribers; and a network reconfiguration agent that (a) determines that at least one of a requested connection to a first terminal associated with a subscriber and a connected communication with the first terminal at least one of will have upon set up and currently has an unacceptable grade of service, respectively, and (b) in response thereto, capable of performing both of the following operations:
  (i) directs the at least one of a requested connection and a connected communication to a second terminal associated with the subscriber, the first and second terminals being different from one another and the first terminal being a wired desk-top terminal other than a cellular telephone and second terminal being a cellular telephone; and
  (ii) changes the communication path for the at least one of a requested connection and a connected communication from a first communication path comprising a first private network but not a second private network to a second communication path comprising the second private network but not the first private network, wherein each of the first and second communication paths are connected to the same set of endpoints that includes the first terminal and the first and second communication paths use a common public network, and wherein the first and second private networks are part of a common enterprise network; wherein the first private network has a higher preference for the at least one of a requested connection and a connected communication than the second private network, wherein the at least one of a requested connection and a connected communication is a requested connection, wherein the requested connection is received by a first port network and/or gateway, wherein the first terminal is connected to a second port network and/or gateway, wherein the first and second port networks and/or gateways are part of the common enterprise network, and wherein each of the first and second private networks connect the first and second port networks and/or gateways.

21. The network of claim 20, wherein the at least one of a requested connection and a connected communication is a requested connection, wherein the requested connection will have an unacceptable grade of service if completed, and wherein the unacceptable grade of service results from a catastrophic failure of a network to which the first terminal is connected.

22. The network of claim 20, wherein the at least one of a requested connection and a connected communication is a connected communication, wherein the communication has an unacceptable grade of service, and wherein the unacceptable grade of service results from congestion of a network to which the first terminal is connected.

23. The network of claim 20, wherein the network reconfiguration agent performs operation (i) and wherein a database accessible by the network reconfiguration agent has, for each of a plurality of subscribers, a corresponding internal first telephone address for a wired terminal supported by an enterprise network and a corresponding external second address for a cellular phone not supported by the enterprise network.

24. The network of claim 23, wherein the at least one of a requested connection and a connected communication is a communication connected on a first connection and wherein the communication has an unacceptable grade of service and wherein in the directing operation a second connection is established between the terminal of a contactee in the communication with the second terminal, the subscriber is notified of the second connection, and, when the subscriber accepts the second connection, the first connection is disconnected.

25. The network of claim 23, wherein the at least one of a requested connection and a connected communication is a requested connection and wherein the requested connection will have an unacceptable grade of service if completed and in the directing operation the requested communication is set up using the second terminal.

26. The network of claim 23, wherein, after operation (i) is performed by the agent, the grade of service for the requested connection increases to an acceptable level and the requested communication is redirected to the first terminal.

27. The network of claim 20, wherein operation (ii) is performed, wherein, in (ii), each of the first and second private networks has a corresponding preference for carrying communications, wherein the preference changes dynamically in response to changes in the grade of service for each of the first and second private networks, and wherein the first private network has a higher preference for the at least one of a requested connection and a connected communication than the second private network.

28. The network of claim 27, wherein, in the changing operation, the agent determines the highest preference private network capable of providing the desired grade of service for the at least one of a requested connection and a connected communication.

* * * * *

UNITED STATES PATENT AND TRADEMARK OFFICE
CERTIFICATE OF CORRECTION

| | | |
|---|---|---|
| PATENT NO. | : 7,983,148 B1 | Page 1 of 1 |
| APPLICATION NO. | : 10/890486 | |
| DATED | : July 19, 2011 | |
| INVENTOR(S) | : Sandra R. Abramson et al. | |

It is certified that error appears in the above-identified patent and that said Letters Patent is hereby corrected as shown below:

Claim 1, Column 10, Line 44, after "cellular phone and" insert --the--.

Signed and Sealed this
Thirteenth Day of March, 2012

David J. Kappos
*Director of the United States Patent and Trademark Office*